US011348388B2

(12) United States Patent
Hadaschik et al.

(10) Patent No.: US 11,348,388 B2
(45) Date of Patent: May 31, 2022

(54) METHOD FOR DETERMINING A RELAY ATTACK, RELAY ATTACK DETECTING DEVICE, AND COMPUTER PROGRAM

(71) Applicant: Fraunhofer-Gesellschaft zur Foerderung der angewandten Forschung e.V., Munich (DE)

(72) Inventors: Niels Hadaschik, Erlangen (DE); Marc Fassbinder, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/973,052

(22) PCT Filed: Jun. 12, 2019

(86) PCT No.: PCT/EP2019/065412
§ 371 (c)(1),
(2) Date: Dec. 8, 2020

(87) PCT Pub. No.: WO2019/238789
PCT Pub. Date: Dec. 19, 2019

(65) Prior Publication Data
US 2021/0366213 A1    Nov. 25, 2021

(30) Foreign Application Priority Data
Jun. 14, 2018   (EP) .................................... 18177862

(51) Int. Cl.
*G07C 9/00* (2020.01)
*B60R 25/24* (2013.01)
*H04W 12/06* (2021.01)

(52) U.S. Cl.
CPC ........ *G07C 9/00309* (2013.01); *B60R 25/241* (2013.01); *H04W 12/06* (2013.01); *G07C 2009/00555* (2013.01); *G07C 2009/00793* (2013.01)

(58) Field of Classification Search
None
See application file for complete search history.

(56) References Cited

U.S. PATENT DOCUMENTS

2004/0051910 A1* 3/2004 Nakahara ........... H04N 1/32005
                                                   358/400
2008/0284564 A1   11/2008 Leitch
2016/0200291 A1   7/2016 Kim et al.

FOREIGN PATENT DOCUMENTS

EP         1033585 A2    9/2000
WO    20160059451 A1    4/2016

* cited by examiner

Primary Examiner — Carlos Garcia
(74) Attorney, Agent, or Firm — 2SPL Patentanwaelte PartG mbB

(57) ABSTRACT

A method to determine a relay attack on an authorization system granting permission on using a resource, includes receiving a signal from an authentication device; determining, whether at least two copies of an authentication signal are included in the signal; and concluding on a relay attack if at least two copies of the authentication signal are identified in the signal.

19 Claims, 3 Drawing Sheets

| Delay | 300 ns | 350 ns | 400 ns | 450 ns |
|---|---|---|---|---|
| Samples at 20 MHz | 6 | 7 | 8 | 9 |
| Twosided distance estimate reduction | 60 m | 45 m | 30 m | 15 m |

$$\psi_M(n) = \sqrt[n]{M_{\phi,ait}(n)}$$
$$r_M(n) = \sqrt{M_A(n)}$$
$$M_{A,\phi}(n) = r_M(n)\sin(\psi_M(n))$$

METHOD FOR DETERMINING A RELAY ATTACK, RELAY ATTACK DETECTING DEVICE, AND COMPUTER PROGRAM

CROSS-REFERENCE TO RELATED APPLICATIONS

This application is a 35 U.S.C. § 371(c) national stage entry of PCT/EP2019/065412, filed Jun. 12, 2019. That application claimed priority to EP 18177862.2, filed Jun. 14, 2018. The contents of the earlier filed applications are incorporated by reference herein in their entirety.

FIELD

Examples relate to wireless communication for authorization methods.

BACKGROUND

In authorization systems, the communication between a mobile transponder and the authorization instance may assure that the user has the permission for the use of a resource (e.g. starting and driving a car) or the access to a piece of infrastructure (e.g. enter a vehicle or a building or access a computer system).

As a solution for keyless building access, key cards with so-called near field communication (NFC), which is a passive RFID technology, are used. A battery less key card may approach the RFID reading device that, after detecting an authorized card (of the holder), may give order to unlock the door. Due to the passive nature and the employed radio frequencies, the reach of these technologies may be limited to several centimeters (<10 cm).

For vehicles, so-called keyfobs that actively communicate with the vehicle are in use that may usually communicate in two frequency ranges of the radio spectrum, low-frequency (LF) and ultrahigh frequency (UHF). However, it may be known that by applying a relay for one or both frequency ranges, the reach of the system can be extended. The signals coming from both sides may be the received by the relay, amplified and forwarded to the respective other device so that the actual keyholder may be several meters (up to 100 m or more) away from the vehicle. In this way, the system may be compromised and the car may unlock on the approach of the relaying device although the keyfob itself is not close enough.

The attack may be avoided by applying a round-trip time (RTT) measurement that may bind the distance to an upper limit (for example 10 m) by measuring the propagation time from the vehicle to the keyfob and back to the vehicle. Possible technologies for determining the propagation time may be ultra-wideband (UWB) transmissions but also frequency-hopping systems (similar to Bluetooth) based on carrier phase measurements (and potentially other extended methods). The latter may have the advantage that they may potentially be a low power technology. Here, in case of a communication between a keyfob and a vehicle, frequency hopping based carrier phase measurements are considered, which are effectively based on measuring a linear phase ramp on the frequency.

A possible attack method may directly alter the phase of the transmission in each channel. This may be battled by using random frequency hopping.

Another possible attack method may use the phase ambiguities in 2π. If the propagation delay $t_{prop}$ is larger than the reciprocal of the minimum spacing of the frequency hopping carriers $$t_{prop} > \frac{1}{\min(f_n - f_m)} \forall m, n$$

then a wrap around of the phase may occur within the minimum spacing of the frequency hopping carriers. This wrap around may not be directly detected so that, in principle, all distance measurements using this method may be ambiguous.

With regard to the above, carrier phase based methods have the disadvantage that they are susceptible to malicious manipulations of the transmitted signals.

Since frequency hopping is based on carrier phase methods, there may be a need for avoiding manipulations of the transmitted signals for detecting relay attacks in order to prevent the same. Embodiments are related to detecting a novel attack on such frequency hopping systems.

SUMMARY

An example relates to a method to determine a novel relay attack on an authorization system granting permission on using a resource. It comprises receiving a signal from an authentication device, determining, whether at least two copies of an authentication signal is included in the signal, and concluding on a relay attack based on late signal echoes if at least two copies of the authentication signal may be identified in the signal.

The novel relay attack may already be detected by simply checking whether there may be two signals detected or not. In case there may be two signals detected, which may be the direct signal and the echo signal, there may be a relay attack.

Another example further comprises receiving the signal from the authentication device of an automotive access system.

The described method may be applied to a vehicle having an authorization system to mitigate the risk of unauthorized use of the vehicle.

In a further example, determining, whether at least two copies of an authentication signal are included in the signal, at least comprises one of a power measurement of samples of the signal, a power computation of the samples of the signal, a phase step detection of the signal, a correlation analysis of the signal, and a super-resolution signal analysis.

In the event the signal comprises multiple subcarriers, the detection of the two signals may be performed either by use of measurements regarding the amplitude of subcarrier signals, or the phase of the same, or regarding the combination of the amplitude and the phase of the subcarrier signals. Further, computing correlations or detecting multiple incident signals at different frequencies in case of super-resolution signal analysis may be used. Having several different methods to determine whether there are two signals detected, it may be an opportunity to compare the results of each method. In this way, results may be verified by use of at least two methods.

In an additional implementation example, a power measurement of samples of the signal comprises averaging signals on multiple subcarriers.

The detection of two signals may be achieved by averaging the subcarrier signals with regard to their amplitude. In the case that the average value may be higher than the predefined threshold, the novel relay attack may be detected. Averaging signals on multiple subcarriers results in a higher signal to noise ratio than a signal of one single subcarrier, which leads to a more precise and reliable value to compare with the predetermined threshold.

In an optional implementation example, a power computation of the samples of the signal comprises compensating a subcarrier phase between a first and a second subcarrier of the signal.

Due to phase shifts between the subcarriers, the relative average phase of the subcarrier signals may first be estimated and then compensated, instead of averaging the subcarrier signals. In this way, a more efficient averaging on multiple signals is achieved with a lower SNR.

According to an example, determining, whether at least 2 copies of an authentication signal are included in the signal comprise detecting phase discontinuities.

Phase discontinuities may be detected by phase step detection, where the phase of each subcarrier signal may be of relevance instead of the amplitudes. Here, also an average value may be compared with a predetermined threshold. In case the average phase value may deviate by more than a threshold from the phase that is determined by the first samples of the received burst, there may be a relay attack detected. In this way, relay attacks may be detected independent from the amplitudes of the corresponding signals.

According to another example, determining, whether at least 2 copies of an authentication signal is included in the signal may comprise combining the power measurement and the phase step detection.

Here, the detection may be based on both the amplitude and the phase of the signals. By use of the combined metric (amplitude and phase), a relay attack may be detected more reliably.

According to a further example, the correlation analysis comprises correlating a received subcarrier signal with a transmitted subcarrier signal to determine an intermediate signal, and correlating the intermediate signal with filter sequences.

By double correlation and comparing the resulting metric with a predefined threshold, the presence of the novel relay attack may be determined with high reliability to avoid false detections.

According to an additional example, the super-resolution signal analysis comprises estimating at least one delay within the signal in a critical delay range, calculating a power level for the delay, and concluding on a relay attack if the power level exceeds a predetermined threshold.

According to an optional example, the power level is only evaluated for delays in a critical range.

Herein, multiple incident signals may be detected at different frequencies. The signals having a delay in the critical range may be separated from the signals having a delay outside the critical range. Based on this selection, algorithms may be applied in order to determine whether the power level may be higher than a predefined threshold resulting in a detection of a relay attack. Due to the fact that only delays in a critical predetermined range are processed further, less effort may be needed for the evaluation of the power level.

In an implementation example, a relay attack detecting device for determining a relay attack comprises a receiver configured to receive a signal from an authentication device, a detector configured to determine, whether at least two copies of an authentication signal are included in the signal, and a processor configured to conclude on a relay attack if at least two copies of the authentication signal are identified in the signal.

In another implementation example, the detector is configured to average signals on multiple subcarriers for performing a power measurement of samples of the signal.

In a further example, the detector is configured to compensate a subcarrier phase between a first and a second subcarrier of the signal for performing a power computation of the samples of the signal.

In an additional example, the detector is configured to detect phase discontinuities for determining, whether at least two copies of an authentication signal may be included in the signal.

In an optional example, the processor are configured to combine the power measurement and the phase step detection for detecting discontinuities.

According to an example, the processor is configured to correlate a received subcarrier signal with a transmitted subcarrier signal to determine an intermediate signal, and to correlate the intermediate signal with test filter sequences according to delays to be tested for performing a correlation analysis.

According to another example, the detector is configured to detect multiple potential delays within the signal in a critical time range, and where the processor is configured to determine whether one of the potential delays is associated with a relay attack if a signal associated to a potential delay has a predetermined power level with respect to a signal associated to no delay.

In another example, an authorization system for granting permission on using a resource comprises a relay attack detecting device, where the processor is further configured to grant permission to use the resource if the novel relay attack is not determined.

In an additional example, a vehicle comprises an authorization system, configured to grant access to the vehicle.

In a further example, a computer program having a program code for, when executed on a processor, causes the execution of a method to determine a relay attack on an authorization system.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 3:
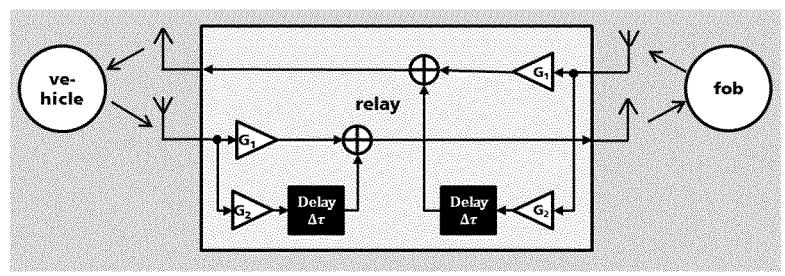
FIG. 3 shows the newly proposed attack method based on introduced echoes of the direct signal.
Figure 4:
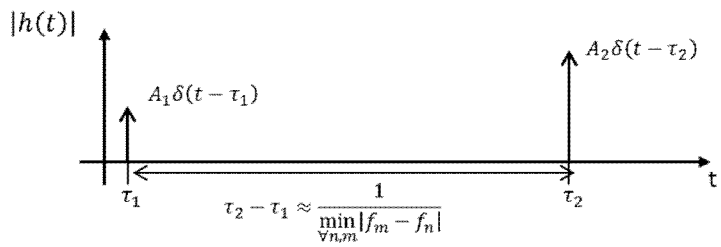
FIG. 4 illustrates a diagram showing the impulse response of the proposed relay.

In order to describe the novel underlying attack more detailed, FIG. 3 schematically describes the novel relay attack, as it may be detected. The novel relay attack may add a replica of the signal (an echo) to the signal that may be delayed by a delay $\Delta\tau$ relative to the direct signal component. The relative delay $\Delta\tau$ may approach the wrap around delay $$\Delta\tau_{wrap} = \frac{1}{2 \cdot \min(f_n - f_m)}$$

(or twice this value if only one side of the link may be manipulated). The second signal may be even stronger (more amplified) than the direct signal. The resulting superposition of both signals may result, if correctly applied, in a reduced estimate of the delay, and consequently, a reduced estimate of the distance. The latter may maliciously undermine the attempt to bound the distance as it is proposed for the general relay attack.

The method may reuse a replica of the transmitted signal and may, thus, not be detected by zero frames without signal transmission. In order to detect an attack based on a late echo, using a signal analysis running on a transmitted non-zero signal may be proposed.

Given a minimum subcarrier spacing, $\min(f_n - f_m) = 1$ MHz, the distance to the late echo may be in the order of $$\Delta\tau_{wrap} = \frac{1}{2 \cdot \min(f_n - f_m)} = 0.5 \mu s.$$

Figure 5:
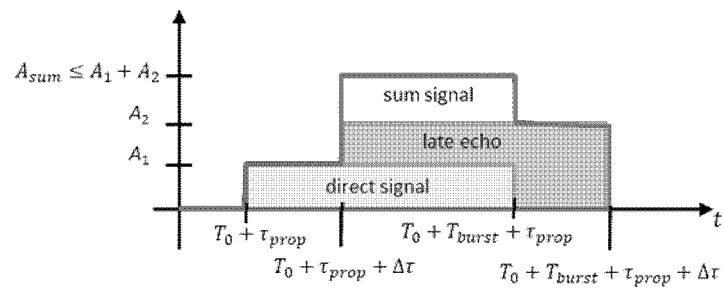
FIG. 5 illustrates a diagram showing the signal envelopes of the direct signal, echo signal and sum signal without noise for the time of the transmission $T_0$.
Figure 6:
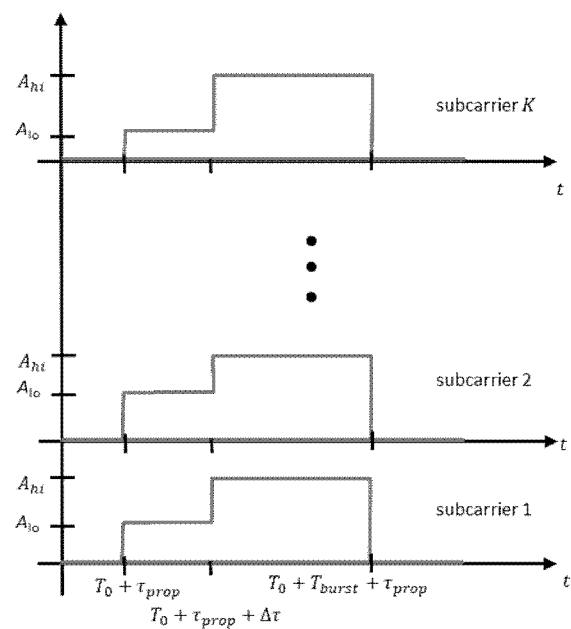
FIG. 6 illustrates signal envelopes for multiple subcarrier bursts.

Thus the attack will also be referred to as late echo attack. Neglecting a modulation of the subcarrier signals, the received carrier signal with rectangular transmission window for the burst of length $T_{burst}$ and for the subcarrier k may be $$y_k(t) = A_1 \exp(j2\pi f_k(t - \tau_{prop})) \left( \frac{t - \frac{T_{burst}}{2} - \tau_{prop} - \Delta\tau}{T_{burst}} \right) + A_2 \exp(j2\pi f_k(t - \tau_{prop} - \Delta\tau)) \left( \frac{t - \frac{T_{burst}}{2} - \tau_{prop} - \Delta\tau}{T_{burst}} \right) + w_k(t)$$

where $A_1$ may be the signal amplitude direct path and $A_2$ may be the signal amplitude of the late echo and $W_k(t)$ may be the system noise. The noise free signal envelope may be observed in FIG. 5, and FIG. 6 represents example signal envelopes of the sum signal for different subcarriers.

As an approach for a countermeasure as a basis for the methods for detecting relay attacks, a superposed echo may be well detected for delays $\Delta\tau$ relative to the first signal component larger than 450 ns, with a given moderate sampling at a rate of 20 MHz (sampling interval 50 ns) and a minimum subcarrier spacing of 1 MHz. This may correspond to a distance estimate reduction of 30 m where the attack may be applied on both sides of the link and it may relate to 9 time domain samples. Other correspondences are assembled in FIG. 7.

Figure 1:
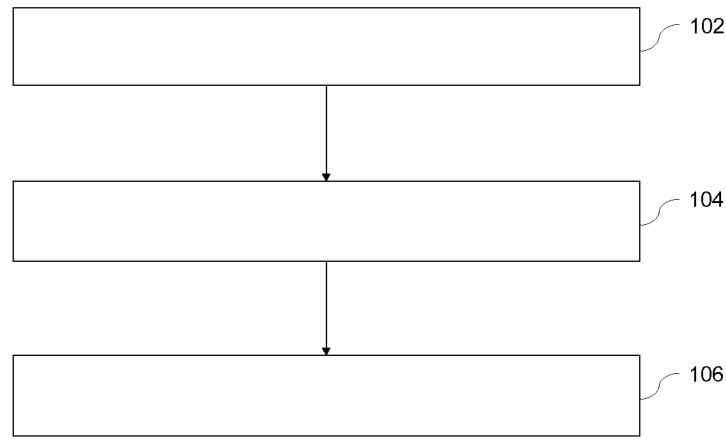
FIG. 1 illustrates a flowchart explaining the method to determine the novel relay attack.

FIG. 1 describes a method to determine a relay attack on an authorization system granting permission on using a resource. It comprises receiving a signal from an authentication device (step 102), determining, whether at least two copies of an authentication signal is included in the signal (step 104), and concluding on a relay attack based on late signal echoes if at least two copies of the authentication signal may be identified in the signal (step 106).

The novel relay attack may already be detected by simply checking whether there may be two signals detected or not. In case there may be two signals detected, which may be the direct signal and the echo signal, there may be the novel relay attack ongoing.

Another example further comprises receiving the signal from the authentication device of an automotive access system.

The described method may be applied to a vehicle having an authorization system to mitigate the risk of unauthorized use of the vehicle.

In a further example, determining, whether at least two copies of an authentication signal are included in the signal, at least comprises one of a power measurement of samples of the signal, a power computation of the samples of the signal, a phase step detection of the signal, a correlation analysis of the signal, and a super-resolution signal analysis.

In the event the signal comprises multiple subcarriers, the detection of the two signals may be performed either by use of measurements regarding the amplitude of subcarrier signals, or the phase of the same, or regarding the combination of the amplitude and the phase of the subcarrier signals. Further, computing correlations or detecting multiple incident signals at different frequencies in case of super-resolution signal analysis may be used. Having several different methods to determine whether there are two signals detected, it may be an opportunity to compare the results of each method. In this way results may be verified by use of at least two methods.

In an additional example, a power measurement of samples of the signal comprises averaging signals on multiple subcarriers.

The detection of two signals may be achieved by averaging the subcarrier signals with regard to their amplitude. In case the average value may be higher than the predefined threshold, a relay attack may be detected. Averaging signals on multiple subcarriers results in a higher signal to noise ratio than a signal of one single subcarrier, which leads to a more precise and reliable value to compare with the predetermined threshold.

Here, a power step must be a distinct upwards step of the received signal power at the delay of the second signal. It may be partially masked by noise and multipath but may be well detectable in expected high SNR scenario at small distances (which the system may be naturally interested in) between the transceivers.

The power step may be detected at the same relative delay position $\Delta\tau$ on all subcarriers, so that also the subcarrier signals may allow for an SNR gain due to averaging according to the metric $$m(t) = \sum_{\forall k} |y_k(t)|^2 = \sum_{\forall k} y_k(t) y_k^*(t) = \sum_{\forall k} A_1^2 \cdot rect\left(\frac{t - \frac{T_{burst}}{2} - \tau_{prop} - \Delta\tau}{T_{burst}}\right) + A_2^2 \cdot rect\left(\frac{t - \frac{T_{burst}}{2} - \tau_{prop} - \Delta\tau}{T_{burst}}\right) + W_k(t)$$

with the noise term $$W_k(t) = 2A_1 A_2 \cos(2\pi f_k \Delta\tau) \cdot rect\left(\frac{t - \frac{T_{burst}}{2} - \tau_{prop} - \Delta\tau}{T_{burst} - \Delta_T}\right) + 2Re\left\{\left[A_1 \exp(j2\pi f_k(t - \tau_{prop})) \cdot rect\left(\frac{t - \frac{T_{burst}}{2} - \tau_{prop}}{T_{burst}}\right) + A_2 \exp(j2\pi f_k(t - \tau_{prop} - \Delta\tau)) \cdot rect\left(\frac{t - \frac{T_{burst}}{2} - \tau_{prop} - \Delta\tau}{T_{burst}}\right)\right] w^*(t)\right\} + |w_k(t)|^2.$$

Therein '∀k' indicates all subcarriers k for which measurements are available. Then the difference term is $$M_P(n) = m(nT) - m((n-1)T) > \text{Threshold},$$

where n is the position of the power step, where it may be sufficient to test only the relevant delays $\Delta\tau$ in the range $\tau_{wrap}/2$ to $\tau_{wrap}$ (250 ns to 500 ns for 1 MHz minimum subcarrier spacing).

Alternatively, the compared samples may be averaged in time $$M_{P,alt}(n) = \frac{1}{L}\sum_{v=n}^{n+L-1} m(nT) - \frac{1}{n-1}\sum_{v=1}^{n-1} m(nT) > \text{Threshold},$$

with an averaging length (n−1) of the first interval and an averaging length L of the second interval.

Strategies for defining thresholds may be heuristically derived from simulations or real world measurements picking a suitable compromise between detection probability and false alarm probability e.g. from an experimental receiver operating characteristic (ROC).

In an optional implementation example, a power computation of the samples of the signal comprises compensating a subcarrier phase between a first and a second subcarrier of the signal.

Due to phase shifts between the subcarriers, the relative average phase of the subcarrier signals may first be estimated and then compensated, instead of averaging the subcarrier signals. In this way, less effort needs to be spend on averaging calculations on multiple signals.

The relative average phase may first be estimated and then compensated against.

An estimate relative to a first burst is made $$\phi_k = \arg\{y_k(nT) y_1^*(nT)\}$$

$$m'(nT) = \left|\sum_{\forall k > 1} y_k(nT) e^{-j\phi_k}\right|^2$$

and then it is tested according to $$M'_P(n) = m'(nT) - m'((n-1)T) > \text{Threshold}$$

or with additional averaging $$M'_{P,alt}(n) = \frac{1}{L}\sum_{v=n}^{n+L-1} m'(vT) - \frac{1}{n-1}\sum_{v=1}^{n-1} m'(vT) > \text{Threshold},$$

with a suitable averaging constant L like above.

It is to be noted that for all amplitude/power threshold tests the threshold may be determined based on the power of the first samples (first signal plus noise) and the expected channel behavior. Also natural echoes may cause similar effects, but natural echoes in the considered higher distances (of the multipath) between 15 m and 60 m (cf. FIG. 7) may usually suffer from significantly reduced power in the distances allowed for authorized access (<10 m). Thus the power steps may be assumed to be weaker due to natural echoes.

According to an example, determining, whether at least 2 copies of an authentication signal are included in the signal comprise detecting phase discontinuities.

Phase discontinuities may be detected by phase step detection, where the phase of each subcarrier signal may be of relevance instead of the amplitudes. Here, also an average value may be compared with a predetermined threshold. In case the average value may be higher than the threshold, there may be a relay attack detected. In this way, relay attacks may be detected independent from the amplitudes of the corresponding signals.

Beyond the amplitude of the signal, also the phase of the recorded signal may suffer from a discontinuity due to the attack. For convenience, the relevant phases are $$\phi_1(f_k)=2\pi f_k \tau_{prop}$$

$$\phi_{\Delta\tau}(f_k)=2\pi f_k(\tau_{prop}+\Delta T).$$

If there is no (or only a little) phase discontinuity (step $\Delta\phi=2\pi f_k \tau_{prop}$) the attack itself may be inefficient as the altering of the carrier phase may be the intended effect of the attacker.

Thus similar detections as for the magnitude may apply $$M_\phi(n) = \sum_{k=1}^{K} |\arg\{y_k(nT)\} - \arg\{y_k(0 \cdot T)\}|^\mu$$

for the relevant delays (n·T) to be tested $$\frac{\Delta\tau_{wrap}}{2} < n \cdot T < \Delta\tau_{wrap}.$$

Alternatively including averaging over intervals of length L<n, the metric may result in the threshold test $$M_{\phi,alt}(n) = \sum_{k=1}^{K} \left| \frac{1}{L}\sum_{v=n}^{n+L-1} \arg\{y_k(vT)\} - \frac{1}{L}\sum_{v=n-L}^{n-1} \arg\{y_k(vT)\} \right|^\mu > \text{Threshold}.$$

The threshold and the exponent μ may be chosen suitably. The exponents μ=1 and μ=2 may already be a good choice.

According to another example, determining, whether at least 2 copies of an authentication signal is included in the signal may comprise combining the power measurement and the phase step detection.

Here, the detection may be based on both the amplitude and the phase of the signals. By use of the combined metric (amplitude and phase), the novel relay attack may detected more reliably (see FIG. 8).

A refined method of detection may be based on a combination of amplitude and phase detector. For example, an attack may be detected if $$M_{\phi,alt}(n) > \text{Threshold}_\phi \text{ and}$$

$$M'_{P,alt}(n) > \text{Threshold}_P$$

or a suitable combination of other phase step detection metrics and amplitude step detection metrics from above.

Also, the metric $$M_{P,\phi}(n) = \sqrt{M'_{P,alt}(n)} \cdot \sin\left(\sqrt[\mu]{M_{\phi,alt}(n)}\right) > \text{Threshold}_{A,\phi}$$

may be a choice for a combined metric with reasonable theoretical foundation for small μ(=1 or 2) describing the arc of a phasor where $$\sqrt[\mu]{M_{\phi,alt}(n)}$$

may be given in rad.

According to a further example, the correlation analysis comprises correlating a received subcarrier signal with a transmitted subcarrier signal to determine an intermediate signal, and correlating the intermediate signal with filter sequences.

By double correlation and comparing the resulting metric with a predefined threshold, the presence of a relay attack may be determined with high reliability to avoid false detections.

Computing correlations is another method for determining a decision metric for the detection of a distant echo attack.

In the (equivalent) baseband, the processing block of the distant echo attack may have the impulse response $$h_k(T,\Delta\tau,A)=\delta(t)\pm A\cdot\delta(t-\Delta\tau)\exp(-j2\pi f_k\Delta\tau).$$

Consequently, the attack may be detected using double correlations. Firstly, the received subcarrier signals $y_{k,n}=y_k(nT)$ may be correlated with the transmitted subcarrier signal $x_{k,n}$ (i.e. convolved with the time-inverse conjugate complex sequence of $x_{k,n}$)

$$r_{k,n} = \sum_{v=1}^{N} y_{k,v-n} \cdot x^*_{k,N-v+1}$$

which may need to cover slightly more than the relevant delay range $$0 \le nT < 2\Delta\tau_{wrap}.$$

Afterwards, the result, an intermediate signal, may be correlated with test filter sequences $$m_{h_k} = \sum_{v=1}^{N_h} r_{k,v-n} \cdot h^*_k((N_{h_k} - v)T, \Delta\tau, A)$$

where $$N_h = \text{ceil}\left(\frac{\Delta\tau}{T}\right).$$

In order to cover, all reasonable sequences $h^*_k$, it may be parameterized according to A, Δτ and the algebraic sign "±" ("+" or "−"). Reasonable ranges for A and T are $$1 \le A \le 10,$$

$$\frac{\Delta\tau_{wrap}}{2} \le \Delta\tau < \Delta\tau_{wrap}.$$

The echo delay Δτ to be tested may be quantized in multiples of the sampling interval T. Then, the metric for the threshold comparisons may result from $$M_h(\Delta\tau = nT, A, \pm) = \sum_{k=1}^{K} |m_{h_k}(\Delta\tau, A, \pm)|^\mu > \text{Threshold}.$$

The exponent μ may be suitably chosen to 1 and 2 (or another value tested to be advantageous). If the SNR dependent threshold may be exceeded it may be decided in favor of a detected attack.

According to an additional example, the super-resolution signal analysis comprises estimating at least one delay within the signal, calculating a power level for the delay, and concluding on a relay attack if the power level exceeds a predetermined threshold.

According to an optional example, the power level is only evaluated for delays in a critical range.

Herein, multiple incident signals may be detected at different frequencies. The signals having a delay in the critical range may be separated from the signals having a delay outside the critical range. Based on this selection, algorithms may be applied in order to determine whether the power level may be higher than a predefined threshold resulting in a detection of a relay attack. Due to the fact that only delays in a critical predetermined range are processed further, less effort may be needed for the evaluation of the power level.

Specifically, super-resolution methods may detect multiple incident signals at different frequencies and may frequently be used in direction of arrival measurements. There, the frequency difference may occur over the antenna elements of an array due to the incident angle (spatial frequency). For a uniform linear array, the received signal $y_m$ may have the proportionality $$y_m \sim \exp\left(\frac{-j2\pi m \Delta \cdot \sin(\theta)}{\lambda}\right).$$

Therein, m is the index of the antenna element, $\theta$ is the angle to the orthogonal, $\lambda = c_0/f$ is the wave length, and $\Delta$ is the uniform antenna spacing.

In the current context, the signals may be detected and separated, in particular the signals having a delay in the critical range may be separated from the signals having a delay outside the critical range. The received signal $y_k$ may have the proportionality $$y_k \sim \exp(j2\pi f_k \tau_{prop}).$$

For equidistant spectral sampling (uniform subcarrier grid) it may be similar to the angular case $$y_k \sim \exp(j2\pi(f+k\cdot\Delta f)\tau_{prop}) = \exp(j2\pi f \tau_{prop}) \cdot \exp(j2\pi k \Delta f \tau_{prop}).$$

Consequently, it is well known that the same methodology as for the angles can be applied for detecting multiple delays. Given a sufficient number of subcarriers (i.e. a sufficient total bandwidth $K \cdot \Delta f$) and a sufficient SNR, the MUSIC algorithm may separate close delays and may thus be capable of detecting the first and the second path in the frequency domain. To do so, MUSIC may determine the eigenvalue decomposition of the covariance matrix over the frequency dimension with N time samples at rate 1/T $$C = \sum_{n=1}^{N} [y_1(nT), y_2(nT), \ldots y_K(nT)]^H \cdot [y_1(nT), y_2(nT), \ldots y_K(nT)]$$
$$= VEV^H.$$

After the separation of the eigenvectors V into noise and signal subspace $V=[V_{noise}, V_{signal}]$ according to the size of the related eigenvalues (large eigenvalues: signal small eigenvalues: noise), all related delays may be tested against according to $$S(\tau) = \frac{s(\tau)^H s(\tau)}{|s(\tau)^H V_{noise}|^2},$$

where the test signal may be $$s(\tau)=[1,\exp(j2\pi \cdot 1 \Delta f \tau), \exp(j2\pi \cdot 2 \Delta f \tau), \ldots, \exp(j2\pi \cdot (K-1) \Delta f \tau)].$$

The delays may be extracted from the local maxima of the test metric $S(\tau)$ (called MUSIC spectrum)

$$[\tau_{max,1} \ldots \tau_{max,P}] = \arg \text{ local max}_\tau \{S(\tau)\}.$$

Afterwards, the P local maxima may be observed for delay differences (to the first delay $T_1$) in the critical range, i.e.

$$\frac{\Delta \tau_{wrap}}{2} < \tau_1 - \tau_p < \Delta \tau_{wrap},$$

where again $$\tau_{wrap} = \frac{1}{\min_{\forall k_1, k_2} (f_{k_1} - f_{k_2})}$$

e.g. $\tau_{wrap}$=500 ns for 1 MHz minimum subcarrier spacing. The testing may be extended by a check of the magnitudes using the above test vectors $s(\tau)$ $$A(\tau_p) = S(\tau_p)^H C s(\tau_p),$$

where $A(\tau_p) > A(\tau_1)$ may apply for a detected $\tau_p$ in the critical range in order to come up with the decision in favor of a detected attack.

Figure 2:
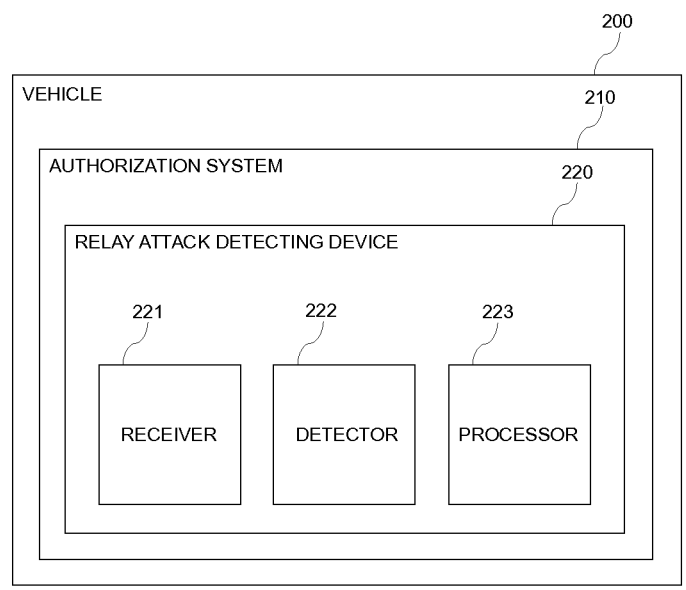
FIG. 2 illustrates a block diagram showing the components of the novel relay attack detecting device.

FIG. 2 shows an example of a relay attack detecting device 220 for determining the novel relay attack including a receiver 221 configured to receive a signal from an authentication device, a detector 222 configured to determine, whether at least two copies of an authentication signal are included in the signal, and a processor 223 configured to conclude on the novel relay attack if at least two copies of the authentication signal are identified in the signal.

In another example, the detector 222 is configured to average signals on multiple subcarriers for performing a power measurement of samples of the signal.

Here, a power step must be a distinct upwards step of the received signal power at the delay of the second signal. It may be partially masked by noise and multipath but may be well detectable in expected high SNR scenario at small distances (which the system may be naturally interested in) between the transceivers. The step may be detected at the same position $\Delta \tau$ of all subcarriers, so that also the subcarrier signals may allow for an SNR gain due to averaging according to the metric. Alternatively, the compared samples may be averaged in time.

Strategies for defining thresholds may be heuristically derived from simulations or real world measurements picking a suitable compromise between detection probability and false alarm probability e.g. from an experimental receiver operating characteristic (ROC).

In a further example, the detector 222 is configured to compensate for a subcarrier phase between a first and a second subcarrier of the signal for performing a power computation of the samples of the signal.

Alternatively, instead of averaging the power samples, the relative average phase may first be estimated and then compensated against.

An estimate relative to a first burst is made and then it is tested according to a threshold.

It is to be noted that for all amplitude/power threshold tests the threshold may be determined based on the power of the first samples (first signal plus noise) and the expected channel behavior. Also natural echoes may cause similar effects, but natural echoes in the considered higher distances (of the multipath) between 15 m and 60 m (cf FIG. 7) may usually suffer from significantly reduced power in the distances allowed for authorized access (<10 m). Thus the power steps may be assumed to be weaker due to natural echoes.

In an additional example, the detector 222 is configured to detect phase discontinuities for determining, whether at least two copies of an authentication signal are included in the signal.

Beyond the amplitude of the signal, also the phase of the recorded signal may suffer from a discontinuity due to the attack. If there is no (or only a little) phase discontinuity, the attack itself may be inefficient as the altering of the carrier phase may be the intended effect of the attacker.

Figures 7, 8:
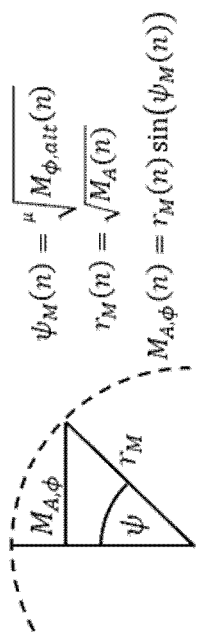
FIG. 7 illustrates a table showing some exemplary data regarding the direct relationship between delay, samples at 20 MHz and distance estimate reduction.
FIG. 8 shows a visualization of a combined metric.

In an optional example, the processor 223 is configured to combine the power measurement and the phase step detection for detecting discontinuities (see FIG. 8).

A refined version of the detector 222 may be based on a combination of amplitude and phase detector.

According to an example, the processor 223 is configured to correlate a received subcarrier signal with a transmitted subcarrier signal to determine an intermediate signal, and to correlate the intermediate signal with test filter sequences according to delays to be tested for performing a correlation analysis.

Computing correlations is another method for determining a decision metric for the detection of a distant echo attack.

In the (equivalent) baseband, the processing block of the distant echo attack may have the impulse response $$h_k(t,\Delta\tau,A) = \delta(t) \pm A \cdot (\delta(t-\Delta\tau)\exp(-j2\pi f_k \Delta\tau).$$

Consequently, the attack may be detected using double correlations. Firstly, the received subcarrier signals may be correlated with the transmitted subcarrier signal. Afterwards, the result, an intermediate signal, may be correlated with test filter sequences according to $h_k$ (t, $\Delta\tau$, A).

According to another example, the detector 222 is configured to detect multiple potential delays within the signal in a critical time range, and where the processor 223 is configured to determine whether one of the potential delays are associated with a relay attack if a signal associated to a potential delay has a predetermined power level with respect to a signal associated to no delay.

Super-resolution methods may detect multiple incident signals at different frequencies and may frequently be used in direction of arrival measurements. There, the frequency difference may occur over the antenna elements of an array due to the incident angle (spatial frequency).

In the current context, the signals may be detected and separated, in particular the signals having a delay in the critical range may be separated from the signals having a delay outside the critical range. For equidistant spectral sampling (uniform subcarrier grid) it may be similar to the angular case.

Consequently, it is well known that the same methodology as for the angles can be applied for detecting multiple delays. Given a sufficient number of subcarriers and a sufficient SNR, the MUSIC algorithm may separate close delays and may thus be capable of detecting the first and the second path in the frequency domain.

An enhancement by forward backward averaging, spatial smoothing or their combination for-ward-backward spatial smoothing may be desirable for the correlated echoes within the subcarrier signals. Signal correlation of the subcarrier signals may exist for echo delays smaller than the reciprocal of the total bandwidth $\tau < T_{corr} = 1/B$ which may be for Bluetooth like signals well below the range of interest. Nevertheless, a limited number of recorded samples may require spatial smoothing and or forward backward averaging in order to increase the rank of the covariance matrix, anyways. Classical smoothing algorithms may require a prior interpolation of the signal onto all subcarriers in between the maximum and the minimum or at least in a regular grid.

The above reasoning may also apply for similar algorithms like ESPRIT as well as further related algorithms like root MUSIC, Unitary ESPRIT, Matrix Pencil, etc.

The computational effort of super-resolution algorithms may be very high such that they may be unsuitable for low power/low cost devices.

It may be unnecessary to measure on all transmissions; a random set of such described measurements may be applied providing a sufficient number of narrowband measurements and a sufficient coverage of the employed spectrum.

In another example, an authorization system 210 for granting permission on using a resource comprises a relay attack detecting device 220, where the processor 223 is further configured to grant permission to use the resource if the novel relay attack is not determined.

In an additional example, a vehicle 200 comprises an authorization system 210, configured to grant access to the vehicle 200.

In a further example, a computer program having a program code for, when executed on a processor, causing the execution of a method to determine a relay attack on an authorization system.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method to determine a relay attack on an authorization system granting permission on using a resource, comprising:
    receiving a signal from an authentication device;
    determining whether at least two copies of an authentication signal are included in the signal; and
    concluding on a relay attack based on late signal echoes if at least two copies of the authentication signal are identified in the signal.

2. The method according to claim 1, further comprising receiving the signal from the authentication device of an automotive access system.

3. A non-transitory computer-readable medium having a program code stored thereon that, when executed on a processor, causing the execution of a method according to claim 1.

4. The method according to claim 1, wherein
    determining whether at least two copies of the authentication signal are included in the signal comprises detecting phase discontinuities.

5. The method according to claim 1, wherein determining whether at least two copies of the authentication signal are included in the signal comprises at least one of:
    a power measurement of samples of the signal,
    a power computation of the samples of the signal,
    a phase step detection of the signal, a correlation analysis of the signal, and
    a super-resolution signal analysis.

6. The method according to claim 5, wherein
    the power measurement of samples of the signal comprises averaging signals on multiple subcarriers.

7. The method according to claim 5, wherein
    the power computation of the samples of the signal comprises compensating a subcarrier phase between a first and a second subcarrier of the signal.

8. The method according to claim 5, wherein
    determining whether at least two copies of the authentication signal are included in the signal comprises combining the power measurement and the phase step detection.

9. The method according to claim 5, wherein the correlation analysis comprises:
    correlating a received subcarrier signal with a transmitted subcarrier signal to determine an intermediate signal, and
    correlating the intermediate signal with filter sequences.

10. The method according to claim 5, wherein the super-resolution signal analysis comprises: estimating at least one delay within the signal, and
    calculating a power level for the delay;
    concluding on a relay attack if the power level exceeds a predetermined threshold.

11. The method according to claim 10, wherein the power level is only evaluated for delays within a critical range.

12. A relay attack detecting device for determining a relay attack, comprising:
    a receiver configured to receive a signal from an authentication device;
    a detector configured to determine whether at least two copies of an authentication signal are included in the signal; and a processor configured to conclude on a relay attack if at least two copies of the authentication signal are identified in the signal.

13. The relay attack detecting device according to claim 12, wherein
the detector is configured to average signals on multiple subcarriers for performing a power measurement of samples of the signal.

14. The relay attack detecting device according to claim 12, wherein
the detector is configured to compensate a subcarrier phase between a first and a second subcarrier of the signal for performing a power computation of the samples of the signal.

15. The relay attack detecting device according to claim 12, wherein
the detector is configured to detect phase discontinuities for determining whether at least 2 copies of an authentication signal are included in the signal.

16. The relay attack detecting device according to claim 12, wherein
the processor is configured to combine the power measurement and the phase step detection for detecting discontinuities.

17. The relay attack detecting device according to claim 12, wherein
the processor is configured to correlate a received subcarrier signal with a transmitted subcarrier signal to determine an intermediate signal, and to correlate the intermediate signal with test filter sequences according to delays to be tested for performing a correlation analysis.

18. The relay attack detecting device according to claim 12, wherein
the detector is configured to detect multiple potential delays within the signal in a critical time range, and wherein
the processor is configured to determine whether one of the potential delays is associated with a relay attack if a signal associated to a potential delay has a predetermined power level with respect to a signal associated to no delay.

19. An authorization system for granting permission on using a resource, comprising:
a relay attack detecting device according to claim 12, wherein the processor is further configured to grant permission to use the resource if a relay attack is not determined.

* * * * *